US007123212B2

(12) United States Patent
Acharya et al.

(10) Patent No.: US 7,123,212 B2
(45) Date of Patent: Oct. 17, 2006

(54) INFORMATION TRANSMISSION AND DISPLAY METHOD AND SYSTEM FOR A HANDHELD COMPUTING DEVICE

(75) Inventors: Shrikant Acharya, Fremont, CA (US); Shrinath Acharya, Fremont, CA (US); John Crosbie, Fremont, CA (US)

(73) Assignee: Harman International Industries, Inc., Northridge, CA (US)

( * ) Notice: Subject to any disclaimer, the term of this patent is extended or adjusted under 35 U.S.C. 154(b) by 824 days.

(21) Appl. No.: 09/746,841

(22) Filed: Dec. 22, 2000

(65) Prior Publication Data

US 2002/0080091 A1   Jun. 27, 2002

(51) Int. Cl.
*G09G 5/00* (2006.01)

(52) U.S. Cl. .................. 345/2.1; 345/901; 382/232

(58) Field of Classification Search ............ 345/2.1, 345/2.2–2.3, 776, 864, 901, 730; 382/232
See application file for complete search history.

(56) References Cited

U.S. PATENT DOCUMENTS

| 5,522,089 | A | * | 5/1996 | Kikinis et al. ............ 395/893 |
| 5,878,276 | A | * | 3/1999 | Aebli et al. ............... 395/839 |
| 5,941,829 | A | * | 8/1999 | Saltzstein et al. ......... 600/509 |
| 6,084,584 | A | * | 7/2000 | Nahi et al. ................ 345/329 |
| 6,236,917 | B1 | * | 5/2001 | Liebl et al. ............... 701/29 |
| 6,310,634 | B1 | * | 10/2001 | Bodnar et al. ............ 345/854 |
| 6,441,811 | B1 | * | 8/2002 | Sawada et al. ........... 345/204 |
| 6,466,198 | B1 | * | 10/2002 | Feinstein .................. 345/158 |
| 6,594,031 | B1 | * | 7/2003 | Taima ...................... 358/1.15 |
| 6,599,147 | B1 | * | 7/2003 | Mills et al. ............... 439/377 |
| 6,774,920 | B1 | * | 8/2004 | Cragun .................... 715/730 |
| 6,779,040 | B1 | * | 8/2004 | Lee et al. ................. 709/247 |
| 6,811,294 | B1 | * | 11/2004 | Elsner et al. .............. 366/75 |

* cited by examiner

*Primary Examiner*—Richard Hjerpe
*Assistant Examiner*—Kimnhung Nguyen
(74) *Attorney, Agent, or Firm*—Brinks Hofer Gilson & Lione

(57) ABSTRACT

Methods and systems for display of information on an external display using a handheld computing device are provided. An expansion module is configured to attach to a handheld computing device such as a personal digital assistance (PDA). The expansion module includes a communication interface to operably connect the module to the computing device via a expansion slot. The module also includes a memory, and an external display controller. When the expansion module is connected to the computing device, the computing device detects the presence of the module. Control software is then executed by the computing system's microcontroller causing graphic control interfaces to be displayed on the computing system's display screen. A user using the control interfaces can operate the control software to cause the computing device display presentation data on the external display device.

23 Claims, 14 Drawing Sheets

| Register Addresses | | Read (16 bits) | Write (16 bits) |
|---|---|---|---|
| High Address bits | Low Address (0-7) | | |
| 0x298000 | 00 | ID, Version #, Status | Interrupt, Timer, Control |
| 0x298000 | 02 | Microcontroller Data Exchange Register | Microcontroller Data Exchange Register |
| 0x298000 | 04 | Microcontroller Data Transfer Status Register | Microcontroller Data Transfer Status Register |
| 0x298000 | 06-0f | Reserved for Future | Reserved for Future |

*FIG. 5C*

FIG. 7A  *After reset*

INFORMATION TRANSMISSION AND DISPLAY METHOD AND SYSTEM FOR A HANDHELD COMPUTING DEVICE

BACKGROUND

1. Field of Invention

The present invention relates to handheld computing systems and, more particularly, to methods and systems for controlling and displaying information on a display device using a handheld computing system.

2. Copyright and Trademark Notice

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed to limit the scope of this invention to material associated with such marks.

3. Related Art

With the advent of the computer, application software has been implemented that allows a user to prepare a presentation in a digital form and later display it using a computer. As laptop computers have become more affordable, digital presentations have become even more popular. Using a laptop computer, business people can conveniently produce, carry, and display their presentations as they move from one place to the next. Unfortunately, however, for a frequent business traveler, carrying the lightest of laptop computers still can be rather inconvenient in comparison to carrying a handheld computing system.

Commonly referred to as palmtops or personal digital assistants (PDAs), handheld computers are, typically, small enough to fit into a shirt pocket or on the palm of your hand. Unfortunately though, due to their small size, handheld computers are less powerful than a typical laptop computer and therefore support only a limited number of applications. For example, while most handheld computers can support simple word processing applications, they do not support graphic or presentation applications such as Microsoft PowerPoint. Further, handheld computers lack the capability to connect to a display device or a power source that can support a long lasting presentation.

It would be very useful for a business traveler to be able to conveniently use a light personal computing device to give a presentation. This invention, its advantages and improvements over the prior art schemes and devices, will be better understood and appreciated by reviewing the following discussion of the current portable computing systems.

Personal Digital Assistants and Palmtop Computers

With advancements in computer and communication technology, the size of computing devices has been dramatically reduced. Although the reduction in size compromises the power and functionality of a computing system, in recent years portable computers have been manufactured that have substantial computing power and utility. Moreover, the evolution of the portable computing devices has been consummated with the introduction of very popular and relatively powerful handheld computing devices commonly referred to as palm tops or personal digital assistants (PDAs).

A PDA, generally, refers to a handheld computer that serves as a digital tool for the storage and organization of personal information. It generally includes an information directory, a calendar, a to-do list, and some form of a conventional text processing application. Some PDAs are pen based and use a stylus to tap selections on graphic menus that are displayed on their screens. Some allow for a user to enter printed characters by simply writing on the surface of the display. A PDA may also include a small on-screen or off-screen keyboard which can be tapped with the stylus pen. Some PDAs provide for data synchronization between a PDA and a desktop computer via cable or wireless communication. A palmtop computer is like a PDA except that a palmtop typically includes a small keyboard whereas the PDA includes a pen. Apple Computer's Message Pad, more commonly known as the "Newton®," was the first to popularize the concept of handheld computer devices.

Due to the advancements in computing power and portability, currently manufactured handheld computing devices conveniently provide a user with access to a wide variety of features and services. A popular handheld computing device is the Palmpilot™ by Palm Corporation, Santa Clara, Calif. A Palmpilot can be used for general and specialized tasks. For example, a user can utilize it to schedule appointments, record contact information, browse the Internet, and send emails. The powerful and easy to use features of the Palmpilot have made it an integral part of the daily life of many of its users.

Unfortunately, a short coming of the Palmpilot and computing devices of the like is that they can only support a limited number of functions in comparison to their larger counterparts, such as laptop computers. Unlike laptop and desktop computers, the current handheld portable computing devices do not include mass media storage units (e.g., hard disk drives) or high capacity memory devices that allow for the storage, retrieval, and execution of one or more resource intensive software applications, such as the Microsoft PowerPoint®. As such, the handheld computers are limited to running customized software applications that are preloaded in their memory and can be supported by their limited resources. To overcome this problem, certain manufacturers have developed handheld devices that include expansion slots for additional functionality.

Handspring™ Corporation of Mountain View, Calif., a Palm OS licensee, manufactures the Visor®, a handheld computing device that includes an interface for the attachment of a separate module that enables the device with additional functionality over the conventional handheld computing devices. This interface also referred to as an expansion slot can be used to allow for the attachment of an electronic module that enables the device to act as a digital camera or a cellular telephone, for example. Unfortunately, no schemes or modules are currently available that allow a user to utilize a handheld computing device to display and control digital presentations on a projector or other display device. A method and apparatus that can provide such functionality would be very useful.

SUMMARY

In accordance with this invention, methods and systems for controlling and displaying information on an external display using a handheld computing device are provided. Embodiments of the system include an expansion module configured to attach to a handheld computing device such as a personal digital assistance (PDA).

In embodiments of the system, application and system software are either preloaded on the computing device's system memory or are alternatively accessible through an external memory. The application software provides the user with special functions or utilities (e.g., calendar, address book). The system software manages the general operation of the computing device. The computing device includes a microcontroller, system memory, system display, and a communication interface. The communication interface is preferably in the form of an expansion slot, configured to receive an expansion module.

The expansion module includes a communication interface to operably connect the module to the computing device via the expansion slot. The module, in certain embodiments, also includes a memory, a communication interface, and an external display controller.

The system and/or module memory can include control software and presentation data (e.g., PowerPoint presentations). Alternatively, presentation data can be included in an external memory device, such as flash memory, operably connected to the module via an external memory interface. Presentation data can be loaded onto the module's memory or the external memory from a desktop computer, for example. The external display controller may include a conversion table in special memory to reformat presentation data to displayable data on an external display. One or more presentations, including audio or video clips or movies may be stored in the system or module's memory.

When the expansion module is connected to the computing device via the expansion slot, the computing device detects the presence of the module and recognizes the expansion module's memory as an extension of the system memory. Control software residing on the system and/or expansion module's memory is then executed by the computing system's microcontroller causing graphic control interfaces (e.g., icons, menus) to be displayed on the computing system's display screen. A user using the control interfaces can operate the control software to cause the computing device to retrieve and display presentation data stored in memory.

In embodiments of the system, presentation data is decoded by a system microcontroller and is displayed via the external display controller on an external display device. A user can control the manner and order of display using the control interfaces on the computing system's screen.

Embodiments of the system include a power feed back line from the display device to the computing system allowing the computing system to rely on the display system's power source, thereby preserving its battery powered energy source. In certain embodiments, the module includes a special purpose microcontroller (e.g., a digital signal processor (DSP)) to independently address processing requirements of the expansion module.

BRIEF DESCRIPTION OF THE DRAWINGS

FIG. 5C illustrates a register map for register addresses implemented in the communication interface between the handheld computing system and the expansion module of FIG. 1, in accordance with one or more embodiments of the system.

FIGS. 7A through 7D are block diagrams according to one or more embodiments of the invention illustrating the components of the microcontroller and the communication interface in the expansion module of FIG. 1, in accordance with one or more aspects of the invention.

Identically marked items in different figures refer to the same or similar items.

DETAILED DESCRIPTION

In the following description, numerous specific details are set forth to provide a more thorough description of embodiments of the invention. Of course, the invention may be practiced without some or all of these specific details or variations in said details.

System Architecture

One or more embodiments of the invention are directed to an expansion module that attaches to a handheld computing system to transfer and display information such as PowerPoint™ presentation on an external display device.

Figure 1:
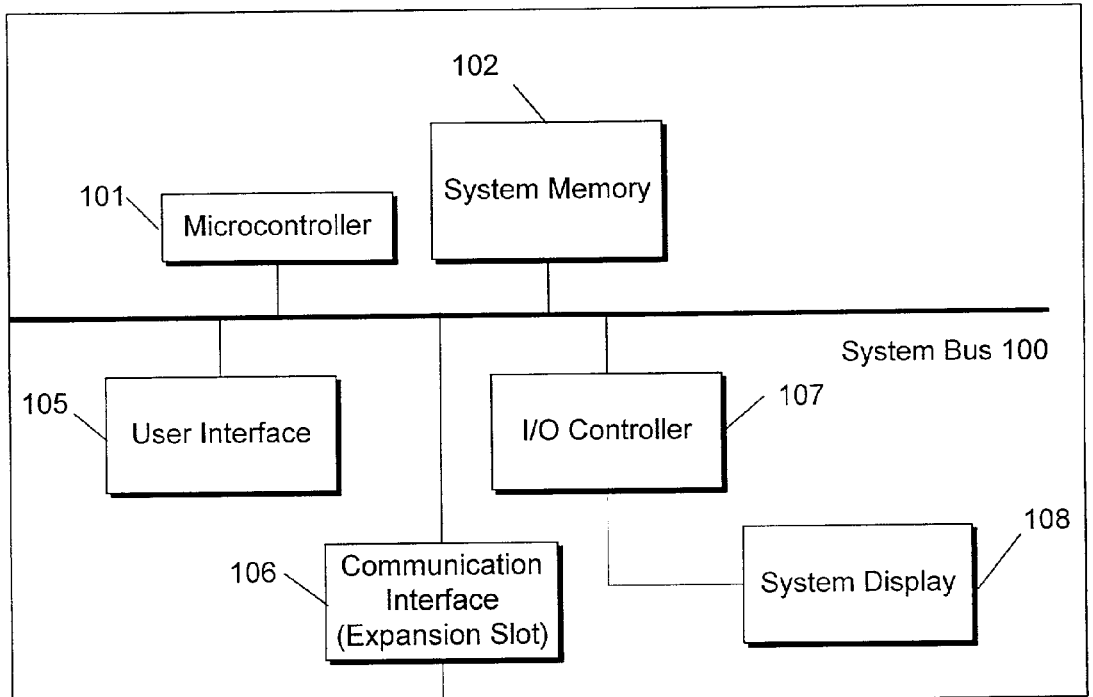
FIG. 1 is a block diagram of an expansion module in conjunction with a handheld computing system and an external display device, according to one or more embodiments of the invention.
Figure 1:
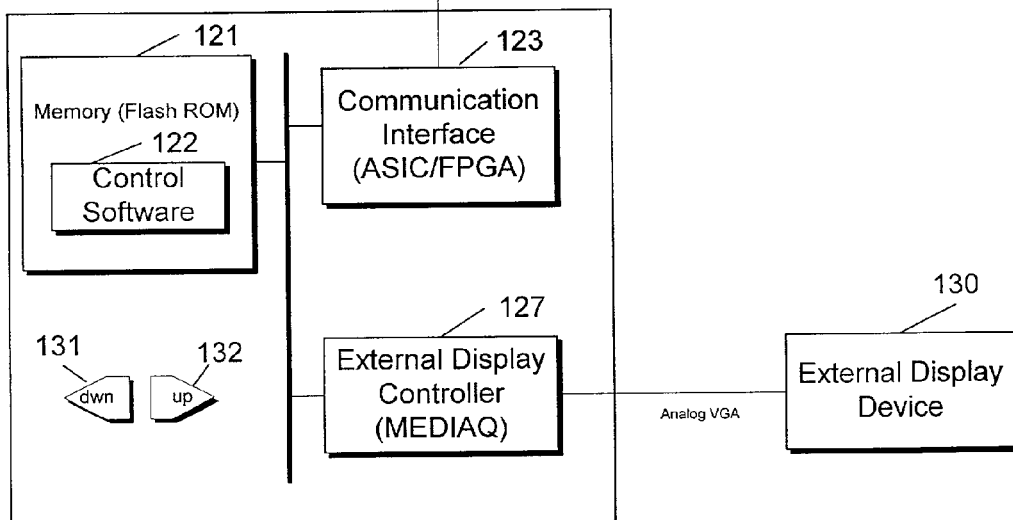

FIG. 1 illustrates a block diagram of a handheld computing system 110 coupled to an expansion module 120. Expansion module 120 is in turn attached to an external display device 130. Handheld computing system 110 can be a personal digital assistant (PDA). A PDA is an organizer for personal information. It generally includes at least a name and address database, to do list, and note taker. PDA's are, typically, pen-based and use a stylist to tap selections on menus and to enter printed characters. Some PDA's include data synchronization options to synchronize data between the PDA and a desktop computer via cable or wireless transmission. Two most popular PDA's are the Palmpilot™ and the Visor™ manufactured by Palm Inc. and Handspring Corporation, respectively.

As shown, the handheld computing system 110 includes a microcontroller 101, system memory 102, user interface 105, I/O controller 107, communication interface 106, system display 108, and system bus 100. Handheld computing system 110 also includes a clock that is not shown in FIG. 1. In certain embodiments, microcontroller 101, system memory 102, communication interface 106, and the system clock can be included in one single chip. The single chip design is developed and used in portable or handheld computing systems and other electronic products where miniature design and size are highly valuable and required.

In one embodiment, microcontroller 101 is a Dragon Ball-EZ CPU 16.58 MHz manufactured by Motorola, for example. System memory 102 is, for example, 2 MB or 8 MB and can be expanded to 32 MB or more by attachment of an expansion module. In embodiments of the invention, the attachment of expansion module 120 serves to expand system memory to 4 or 10 MB as it includes additional 2 MB of memory. Control software 122 for controlling the operation of the system and image data can be loaded onto system memory 102 and/or memory 121.

In embodiments of the invention, the execution of control software causes the system to display graphical user interface for interacting and controlling the system on system display 108. System display 108 can be a 160×160 pixels liquid crystal display (LCD). User interface 105 is a graphical user interface. In embodiments of the invention, user interface 105 is implemented as hardware in handheld computing system 110. System bus 100 is the communication medium used to transfer data and control signals among the components of handheld computing system 110.

In accordance with an aspect of the invention, communication interface 106 is a 68-pin connector expansion slot. An example of an expansion slot used in one or more embodiments of the system is a Springboard connector manufactured by Handspring Corporation. The connector provides access to a portion of microcontroller 101 address and data space so that handheld computing system 110 can communicate with other devices. In some embodiments, communication interface 106 is an expansion of the system bus that, for example, includes a 24-bit address bus, a 16-bit data bus, one or more read/write lines, and one or more chip select lines.

The address bus is an internal channel from microcontroller 101 to memory 102 across which data addresses are transmitted. The number of lines in the address bus determines the amount of memory that can be directly addressed as each line carries one bit of the address. For example, 20 address lines are used to address a maximum of 1,048,576 bytes, and 24 address lines can address 16,777,216 bytes. The data bus is an internal pathway across which data is transferred to and from the microcontroller 101. The read/write and chip select lines provide the means for input and output of information to and from handheld computing system 110. I/O controller 107 handles input/output requests between handheld computing system 110 and expansion module 120 by presenting signals on read/write or chip select lines. As such, control and data signals are communicated to expansion module 120 via communication interface 106.

Expansion module 120 includes memory 121, communication interface 123, and external display controller 127. Expansion module 120 is attached to external display device 130 through external display controller 127. User interface buttons 131 and 132 can be implemented as graphic interfaces (e.g., displayed on system display 108) or hardware (e.g., electrically activated buttons) in the system. As described in further detail below, using the user interface buttons 131 and 132, a user can control the display of a presentation on external display device 130.

Memory 121, in one embodiment of the invention, is flash ROM memory. Flash memory is a memory chip that can be re-written and holds its content when power is shut off. Flash memory is widely used for digital film and storage, in a variety of handheld devices. In embodiments of the invention, memory 121 is used for storage of graphical information such as PowerPoint Presentations. As explained earlier, in certain embodiments of the invention, memory 121 is recognized as an extension of system memory when expansion module 120 is attached to handheld computing device 110. As such, memory 121 can be used to store control software 122 as well as image data, if needed. In accordance with one aspect of the system, memory 121 can also be used to back up information stored on handheld computing system 110.

Communication interface 123 can be implemented in the form of an application specific integrated circuit (ASIC) or a field programmable gate array (FPGA). An ASIC is a logic chip that is custom designed for a specific application rather than a general-purpose chip such as a microprocessor. The use of ASIC's improves performance over general purpose CPUs because ASIC's are hardwired to do a specific job and do not incur the overhead of fetching and interpreting stored instructions. A field programmable gate array functions in the same manner as an ASIC, however, an FPGA is a programmable logic chip with a high density of programmable logic elements. The logic elements can be programmed to perform selected function. In embodiments of the system, communication interface 123 is implemented in the form of an ASIC or FPGA that can multiplex data bits decoded by microcontroller 101 into a format that meets the requirements of external display controller 127. (e.g., multiplex 16 bit data to 32 bit data).

External display controller 127 converts images decoded by microcontroller 101 or other processors to electronic signals that are then forwarded to external display device 130. External display controller 127 determines, for example, the maximum resolution, the maximum refresh rate, and the number of colors that can be sent to the external display device 130. In embodiments of the system, external display controller 127 is an MQ-200, MQ-Tenerife, or MQ-300 graphic controller, for example, manufactured by MediaQ Corporation, Santa Clara, Calif. MQ-200 is a highly integrated 2D accelerated graphics and display sub-system on a single chip. In certain embodiments, external display controller 127 includes an integrated frame buffer. The frame buffer acts as a storage area for image data before external display controller 127 processes the data to meet the configuration requirements of external display device 130. An MQ-200 has a 2 MB embedded frame buffer (also called memory buffer), for example.

In embodiments of the invention, microcontroller 101 architecture includes a system bus 100 that supports a 24-bit address bus and a 16-bit data bus. In embodiments of the invention, where external display controller 127 is, for example a MQ-200, communication interface 123 is an ASIC or FPGA that acts as a 16 to 32 bit multiplexor. Communication interface 123 converts 16 bit data, forwarded from handheld computing system 110, to 32 bit data, because MQ-200 requires a 32-bit data bus. External display device 130 can be an external monitor such as a Liquid Crystal Display (LCD) screen, a projector, a cathode ray tube (CRT) monitor, or other suitable display device.

Figure 2:
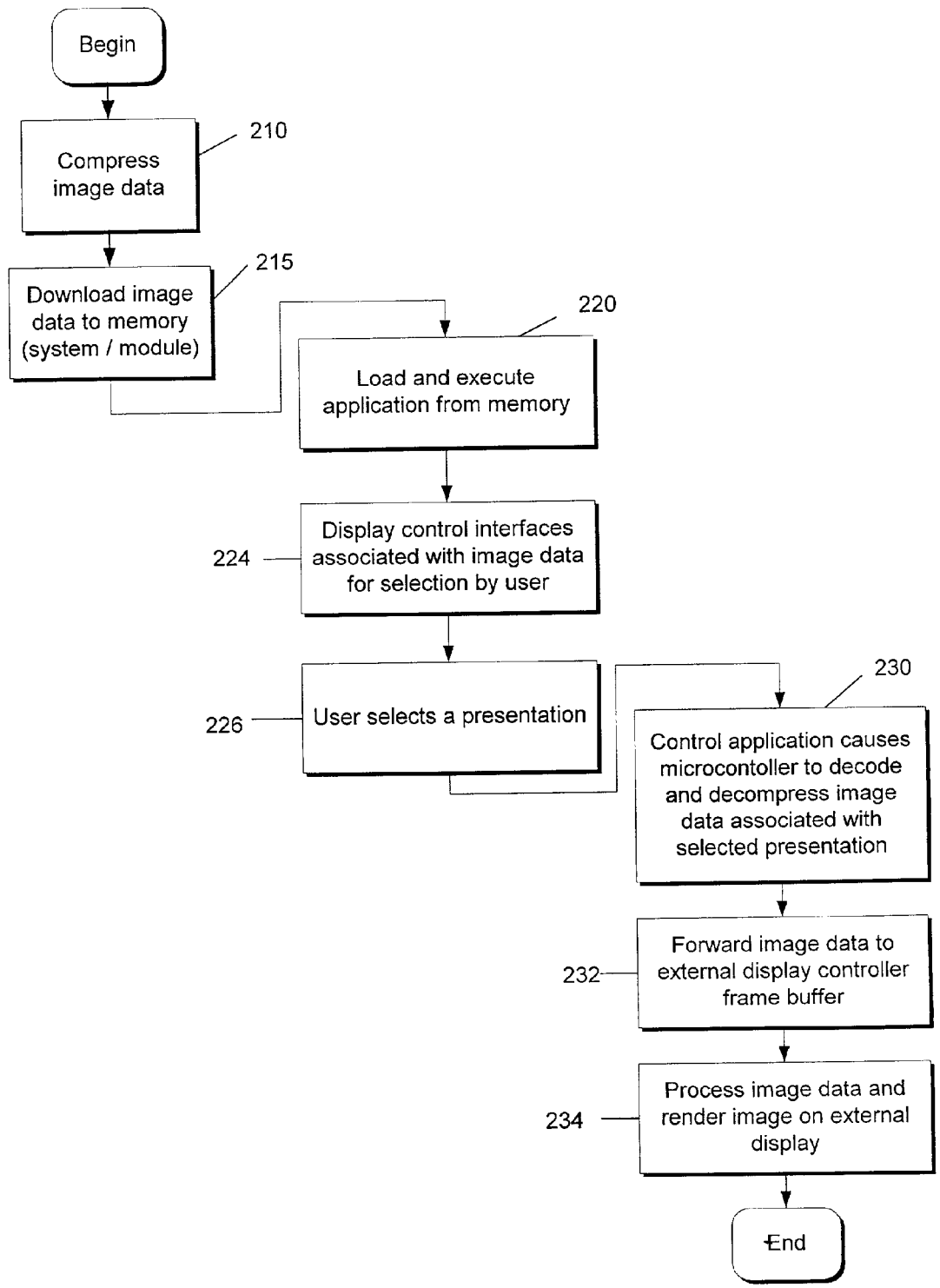
FIG. 2 is a flow diagram of a method of displaying one or more presentations on an external display device, using the expansion module of FIG. 1.

FIG. 2 illustrates a flow diagram of a method of transmitting and displaying information on an external display device, according to one or more embodiments of the system. In the following, embodiments of the invention are described as applicable to storage and display of PowerPoint presentations using expansion module 120 of the invention as attached to handheld computing system 110, such as a Visor or a Palmpilot. However, said description is provided by way of example and should not be construed as a limitation. The invention can be used to store and process any kind of presentation for display on any medium and system.

System Software

The system of this invention operates in conjunction with one or more software applications. One aspect of the system is directed to compression software configured to compress and transfer PowerPoint presentations created using a general purpose computer (e.g., a personal computer), onto handheld computing system 110. Another aspect of the system is directed to control software configured to control the operation of handheld computing system 110 in conjunction with expansion module 120 for display of image data on external display 130.

Figure 3A:
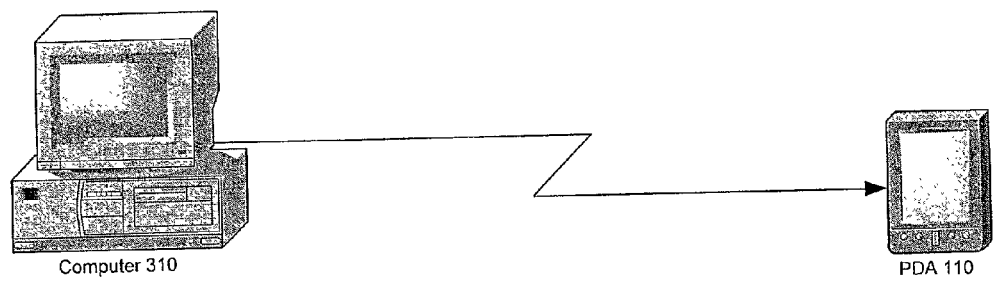
FIGS. 3A through 3C illustrate a handheld computing system in conjunction with the expansion module of this invention (not shown) in communication with one or more computers and a display device.

FIG. 3A illustrates handheld computing system 110 attached to a desktop computer 310. Computer 310 can be used to create PowerPoint presentations, for example. In accordance with one aspect of the system, the compression software is implemented as a printer driver that accepts input data from PowerPoint application or other application software running on computer 310. A plug-in macro is installed on computer 310 for the PowerPoint application, in a manner well-known in the art, so that the plug-in macro can call the compression software as if it is writing to a printer driver.

A plug-in macro is an auxiliary program code that is dependent and works with an independently executable software application to enhance the software's features and operational capability. For example, a plug-in macro is installed, in accordance with one aspect of the system, to allow a user to save PowerPoint presentations in a format suitable for delivery to handheld computing system 110. Referring to FIG. 2, at step 210, the plug-in macro is executed on computer 310 to compress selected PowerPoint presentations into one or more compressed image files (e.g., Palm OS database).

In accordance with one aspect of the system, presentation data can be exported from the PowerPoint application to an existing presentation database on computer 310, or stored as a new presentation database. Alternatively, any application running on computer 310 can forward presentation data to the compression software implemented as a printer driver. In embodiments of the system, presentation or image data is written to the driver in bitmap format. The compression software compresses image data received in bitmap format into a compressed format.

In some embodiments, the compression format used is the Mobile Interface Graphics (MIG) format. The MIG format is a compressed data format based on compression techniques known to those skilled in the art. Thereafter, a presentation organizer application is executed on computer 310. The presentation organizer then either appends the compressed image data to a pre-existing presentation database on computer 310 or saves it as a new presentation database.

Figure 3B:
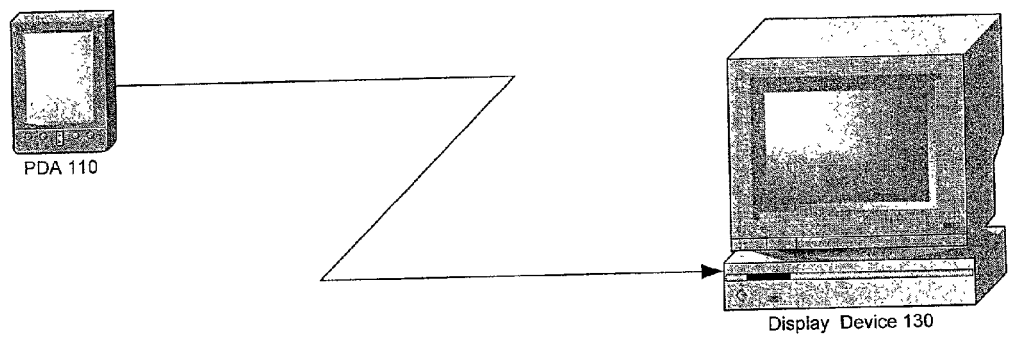
Figure 3C:
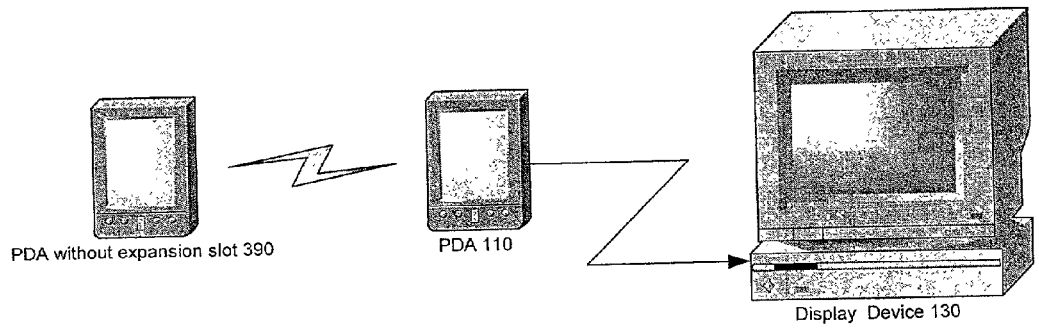

The presentation database can be in the PalmOS database format, for example, and stored in a specific location (e.g., a database or folder) on computer 310's harddrive to be transferred to handheld computing system 110, in a well-known manner. The transfer between computer 310 and handheld computing system 110 can be accomplished by using commercially available software such as HotSync™, for example. Thus, at step 215, the compressed image data is downloaded onto handheld computing system 110's system memory 102 from computer 310's hard drive, as illustrated in FIG. 3B. In some embodiments, compressed image data is downloaded onto handheld computing system 110 from another handheld computing device 390 instead of computer 310, as illustrated in FIG. 3C.

Certain handheld computing devices, such as handheld computing device 390 may not include an expansion slot for receiving an expansion module, such as expansion module 120. Image data is downloaded onto such a handheld computing device (e.g., Palm III) in the manner described above. Thereafter, image data downloaded onto said handheld computing device is transferred to handheld computing system 110 via other communication means available for transfer of data between handheld computing systems, in a well-known manner. For example, image data can be transferred between handheld computing device 390 and 110 via infra-red communication ports.

A Visor or Palmpilot system memory is typically limited to 2 MB. Thus, the amount of compressed image data that can be downloaded is limited to memory 102's capacity. A typical compressed PalmOS database that includes presentation data requires less than one Megabyte of memory. However, if expansion module 120 is attached to handheld computing device 110, at step 215, memory 121 is recognized as an expansion of system memory and thus allows for downloading image data directly to expansion module 120's memory 121. Data transfer between handheld system 110 and computer 310 takes place in a well-known manner (e.g., via wireless, or wired communication interfaces).

To display the graphic presentations on external display device 130, expansion module 120 is attached to handheld computing device 110 and external display device 130, as illustrated in FIGS. 1 and 3B. Expansion module 120 is attached to handheld computing system 110 via communication interfaces 106 (e.g., springboard expansion slot) and communication interface 123 (e.g., ASIC/FPGA). In certain embodiments, expansion module 120 is connected to external display device 130 via a graphic transmitter, for example. Further details on the type of data output generated by the transmitter are provided below.

In embodiments of the invention, when expansion module 120 is attached to handheld computing system 110, computing system 110 automatically powers up expansion module 120. Communication interface 106 detects the attachment of expansion module 120 and forwards a notification (e.g., an interrupt signal) to microcontroller 101 to indicate the attachment of expansion module of 120. Handheld computing system 110 includes embedded system software (e.g., Basic Input Output System (BIOS) and/or Operating System (OS)) that takes over the control of the system, once it is turned on. System software includes a set of routines for testing handheld computing system 110 and preparing it for operation by querying a small memory bank (e.g., CMOS) for configuration settings on start up. System software sets up pointers (interrupt vectors) in system memory 102 to access those routines and then resets expansion module 120.

System software then registers expansion module 120 with handheld computing system 110. Referring to FIG. 1, depending on system implementation, memory 121 is used for the storage of control software 122 that is directed to a method of controlling the display of presentation data on external display device 130. At step 220, handheld computing system 110 loads control software 122 into system memory 102 and executes it. Alternatively, all or part of control software 122 can be loaded and executed on module memory 121. Further, in accordance with one aspect of the invention, at step 220, external display controller 127 is initialized and programmed to process presentation data for display on external display device 130.

External display controller 127 is a low power consumption graphics controller that converts images (e.g., characters, graphic patterns) from a bitmap format, for example, into electronic signals in a well-known manner. In one or more embodiments of the invention, external display controller 127 is an MQ-200 that includes a programmable timing generator and a programmable pixel serializer. Registers included in display controller 127 are programmed in a well-known manner by control software 122 to appropriately configure the resolution, color depth, refresh rate, and other display parameters.

In embodiments of the invention, handheld computing device 110 is attached to external display device 130 via an intelligent port that can query the device for configuration information so that control software 122 can set the display parameters accordingly. For example, a VESA Display Data Channel (VESA DDC) standard communications channel between the display adapter and monitor can be implemented to pass Extended Display Identification Data (EDID) from the monitor to the display adapter. EDID information describes a monitor's characteristics (e.g., vendor name, serial number, frequency range).

Referring to FIG. 2, according to one aspect of the system, at step 224, execution of control software 122 causes the system to display control interfaces associated with image data on system display 108. Depending on implementation and design, various control menus are displayed in form of a graphical user interface illustrated in FIGS. 4A through 4J. FIGS. 4A through 4J are provided by way of example only and for illustration purposes. Other embodiments of the invention can be implemented to provide user interactive menus with different look and feel.

Figure 4A:
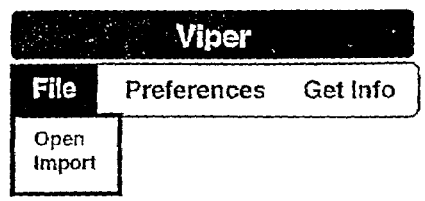
FIGS. 4A through 4J illustrate the graphical user interface displayed on the handheld computing system of FIG. 1, in accordance with one or more embodiments of the system.
Figure 4B:
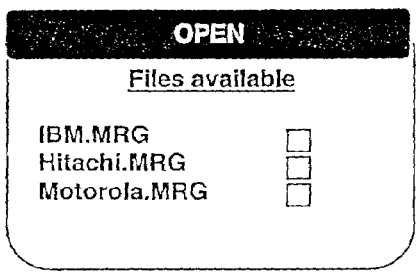
Figure 4C:
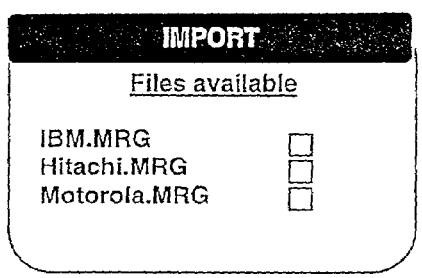

In one or more embodiments of the invention, interacting with the graphical user interface, a user can select presentation data, for display, at step 226. As illustrated in FIGS. 4A and 4B, depending on the number of databases downloaded from computer 310, a list of available files are displayed to a user, in response to selecting File Open from the user interface menu, for example. In certain embodiments of the invention, the user can also interact with the menu to import certain databases from computer 310, as illustrated in FIG. 4C. Further, a user may be able to interact with the GUI menu to copy or move files between system memory 102 and expansion module 120's memory 121.

Figure 4D:
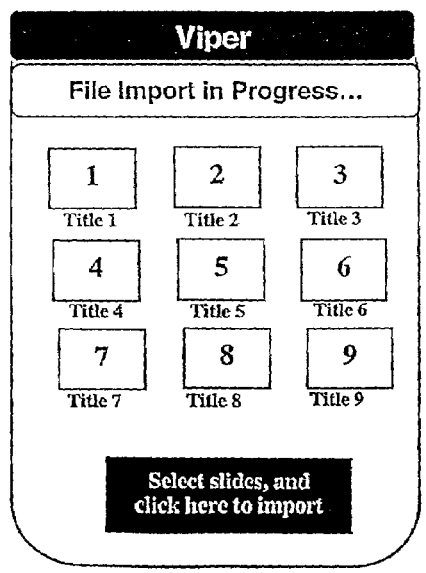

Once the selected file has been imported, the user can select the presentation by, for example, highlighting the name of the presentation (e.g., IBM.MRG). The import feature can be also used to import slides from another database into a currently selected database. FIG. 4D illustrates the graphical user interface displayed once a database is selected. Boxes one through nine represent slides that make up the selected presentation. The slides can be also graphically presented in form of a list or in other suitable manner. A user can select each individual slide for inclusion in a slide show. Alternatively, if the system is in the import mode, then the user can select one or more slide for inclusion in a currently selected database. That is, using the import feature, one or more slides in one presentation can be included in another presentation.

Figure 4E:
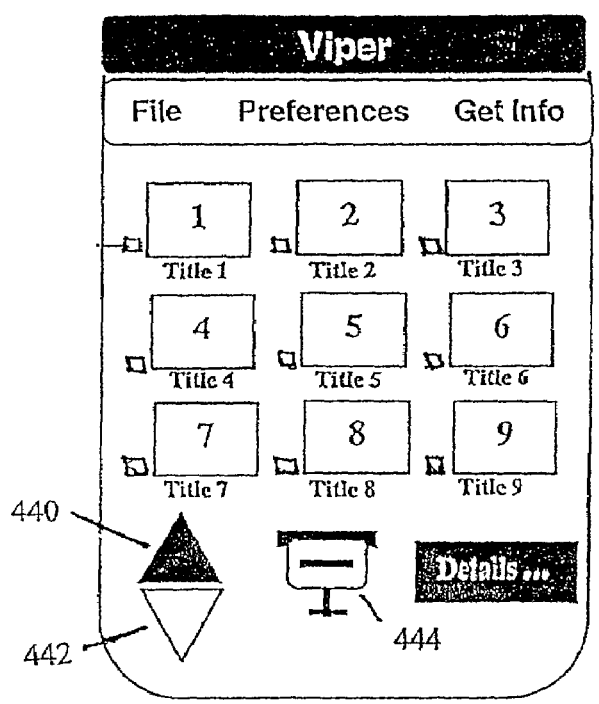
Figure 4F:
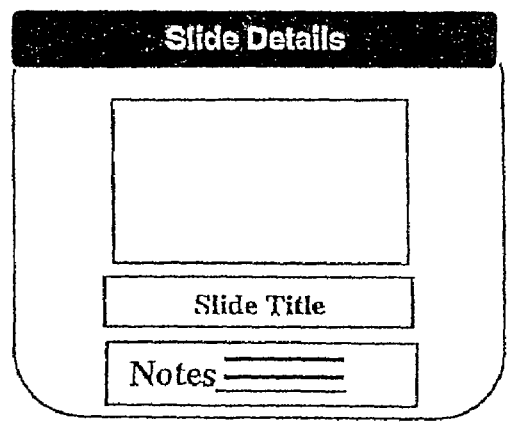

In embodiments of the invention, as illustrated in FIG. 4E, a check box is associated and displayed next to each slide. A user may check the check box associated with a slide, if he wishes to include that slide in the slide show. The user can also rearrange the display order of the slide in the show by dragging and dropping the slide in a desired location. The control software automatically reorders the presentation. The user can view a slide in more detail by selecting a specific slide. A user can select a slide by tapping on a box with his finger or a stylus pen, for example. FIG. 4F is an example of various information that may be displayed as a result of selecting an individual slide. For example, the slide's graphic features, title, and notes associated with the slide may be displayed.

Graphically displayed control buttons 440, 442, and 444 illustrated in FIG. 4E, can be used to control the manner in which slides are displayed. For example, buttons 440 and 442 may be used to advance the slide show or revisit previous slides. Button 444 may be used, for example, to start a slide show. In some embodiments of the invention, part of the control interface is implemented as hardware buttons 131 and 132 as shown in FIG. 1. Thus, for example, pressing on button 131 causes the system to display a previous slide and pressing on button 132 causes the system to display the next slide.

Figure 4G:
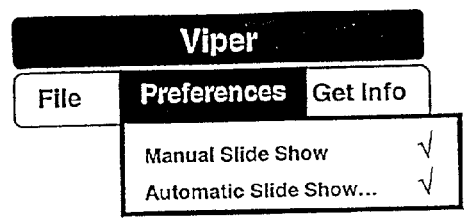
Figure 4H:
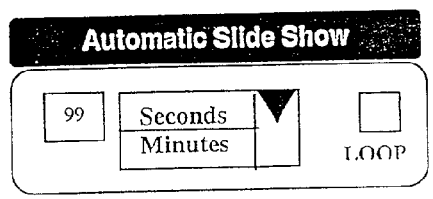

In addition to the above control buttons, a user may interact with drop down menus to control the display of a slide show. As illustrated in FIG. 4G, a user may select from a preference menu, for example, to start a manual or automatic slide show. A manual slide show option is set when the user desires to control the transition from one slide to the next. If the user selects the automatic slide show, then as illustrated in FIG. 4H the system prompts the user to set the time transition between slides. In accordance with an aspect of the system, the user can for example set the time between 1 to 999 seconds, minutes, or a combination of the two. The user can also select to continuously display the presentation in a loop such that the presentation starts over once the last slide is displayed.

Figure 4I:
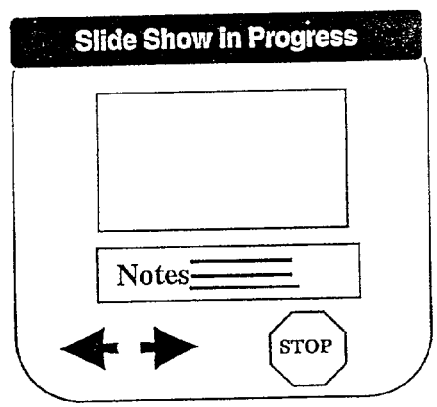
Figure 4J:
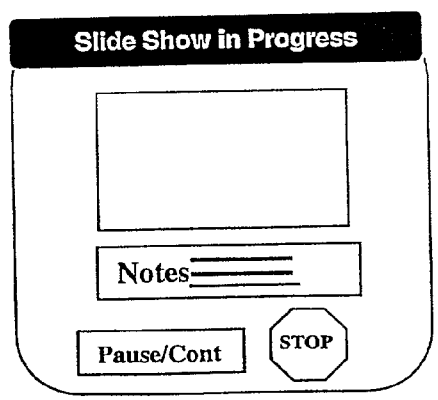

FIG. 4I illustrates the user interface displayed on system display 108 (FIG. 1) while the slide show is in progress, during a manual slide show. Control interfaces are provided to advance the slide show forward or backward, or to stop the show. FIG. 4J illustrates the user interface displayed on system display 108 while the slide show is in progress, during an automatic slide show. Control interfaces are provided to pause, continue, or stop the slide show.

Referring back to FIG. 2, at step 230, in response to user interaction with the system, control software 122 causes microcontroller 101 to decode and decompress image data associated with a selected PowerPoint presentation. In embodiments of the invention, decoded image information is forwarded to external display controller 127, at step 232, via communication interfaces 106 and 123 (FIG. 1). In accordance to one aspect of the invention, data transfer between communication interfaces 106 and 123 is accomplished by memory mapping.

Memory mapping refers to a method of communication wherein, instead of directly writing to a communication port (e.g., I/O port) using standard read/write commands (e.g., IOR or IOW signals), specific memory locations are allocated for input and output functions. Thus, instead of presenting data using standard read/write commands, the data is presented to a designated memory location when memory read (e.g., MEMR) or memory write (e.g., MEMW) signals are activated.

Figure 5A:
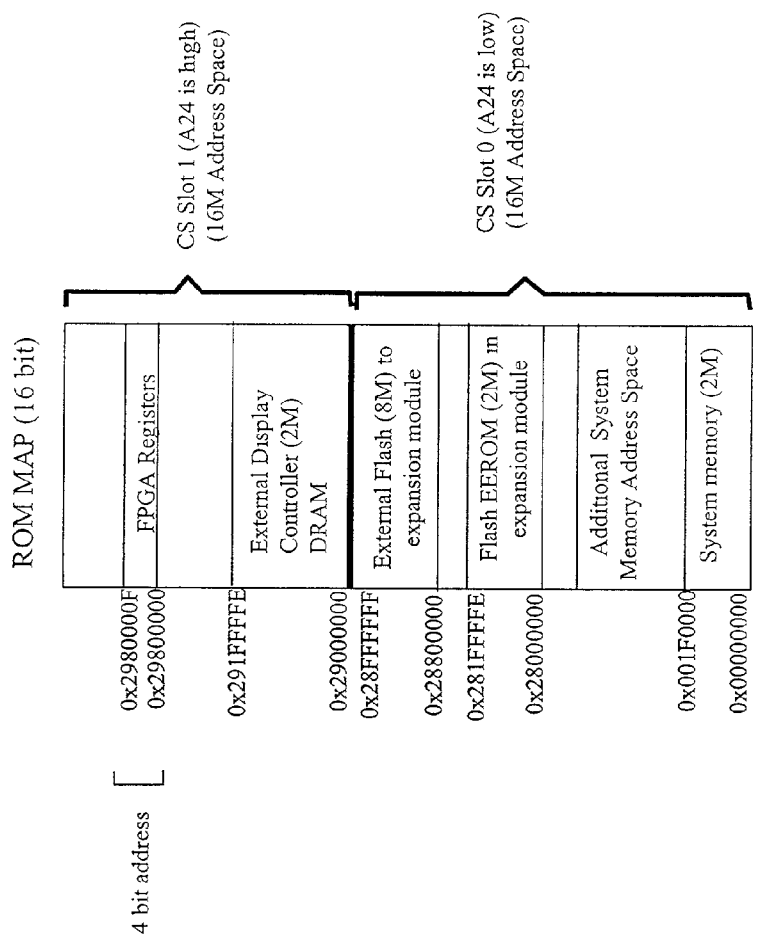
FIG. 5A illustrates a memory mapped address space for the communication interface between the handheld computing system and the expansion module of FIG. 1, according to one or more embodiments of the invention.

In certain embodiments, display controller 127 includes an on-chip frame buffer. An on-chip frame buffer is a storage medium (e.g., 2 MB DRAM memory) which is used to store image data decoded by microcontroller 101. FIG. 5A illustrates a memory mapped address space, in accordance with one or more embodiments of the system. The upper memory block (0x28000000–0x281FFFFE) represents 2 MB flash ROM memory 121 in expansion module 120, for example.

The middle memory block (0x00000000–0x001F0000) represents 2 MB system memory 102 in handheld computing system 110, for example. The lower memory block (0x29000000–0x291FFFFE) represents 2 MB of DRAM in external display controller 127, for example. In embodiments of the invention, the exemplary memory space described above is mapped in a well-known manner to allow microcontroller 101 to address both memory 121 and memory buffer in the external display controller as an extension of system bus 100.

Once microcontroller 101 has decoded and decompressed image data, microcontroller 101 requests access to memory in an address range associated with the external display controller's memory buffer (e.g., 0x29000000–0x291FFFFE). In certain embodiments of the invention, a chip select line is implemented in a well-known manner, such that if chip select signal is set to zero then module memory 121 (e.g., 0x28000000–0x281FFFFE) or system memory 102 (e.g., 0x00000000–0x001F0000) is selected. If chip select signal is set to one then memory buffer in external display controller 127 is selected. Thus, when chip select signal is set to one, a strobe on micro controller 101×s write line will present an address bit associated with the external display controller 127's memory buffer on the address bus. Consequently, data is routed through communication interfaces 106 and 123 to external display controller 127's memory buffer.

At step 234, image data in the memory buffer is processed and an image is rendered on external display 130, while image information for the next frame is decoded by microcontroller 101. Rendering is the process of drawing lines, windows, characters, and other objects, in the memory buffer. Particularly, external display controller 127 scans the data in the memory buffer and outputs image data at a pre-configured horizontal or vertical sync rates to an analog or parallel digital output, in accordance with one or more embodiments. External display controller 127 determines the maximum display resolution, refresh rate (e.g., 60 frames per second), and number of colors for external display device 130. The following display resolution formats are examples of resolutions supported by one or more embodiments of the system:

1024×768 (XGA) 8-bit color

800×600 (SVGA) 8-bit color

640×480 (VGA) 8-bit color

In one or more embodiments of the invention, external display controller 127 is an MQ-200 that includes one or more graphic controllers. Each graphic controller includes a programmable timing generator and a programmable pixel serializer. The programmable timing generator generates timing signals that help establish a stable display area on external display device 130. The programmable pixel serializer fetches presentation data from the memory buffer, adds color information as needed, and forwards a stream of pixels to external display device 130.

Presentation data is stored in the memory buffer (also referred to as frame buffer) as an array of pixels. Each pixel specifies the color for one point on external display device 130. In one or more embodiments of the invention, each pixel value corresponds to a 24-bit value stored in a color lookup table (LUT).

The LUT includes one or more 256×8 tables, for example, expanding the pixel value to 24-bit color, with 8 bits each for red, green, and blue.

Figure 5B:
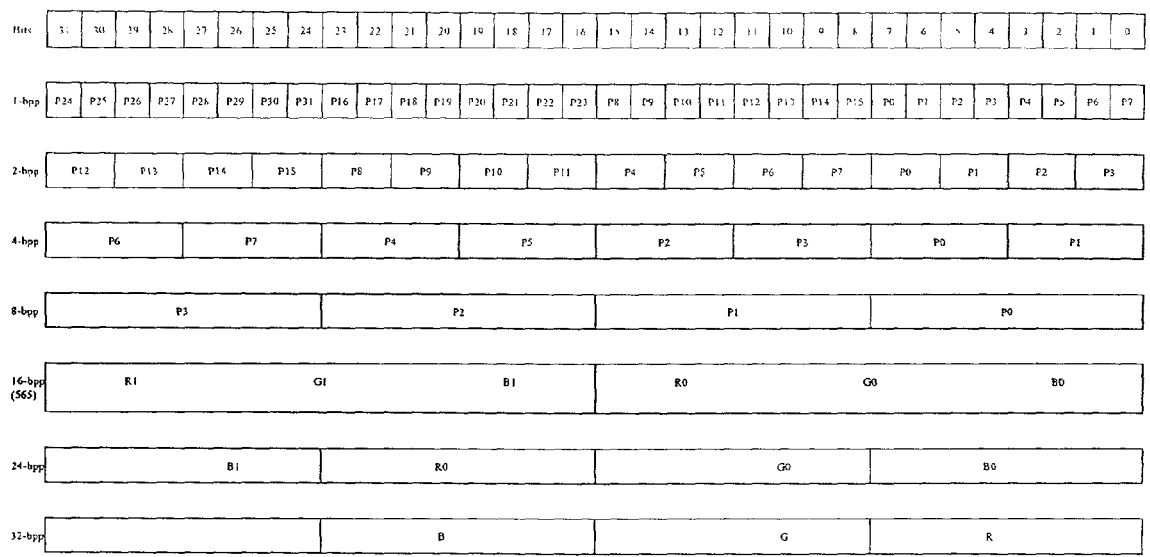
FIG. 5B illustrates various formats in which image data can be stored, in accordance with one or more aspects of the invention.

In embodiments of the invention, the frame buffer is a first in first out (FIFO) memory buffer such that graphic controllers read image or pixel data into the frame buffer before it is needed to be displayed. Pixel data is then taken from the frame buffer one pixel at a time and input to the color lookup table for expansion into a 24-bit color value, for example. The 24-bit color value is then input to the selected display interface for output to external display device 130, as discussed in further detail below. FIG. 5B illustrates various formats in which image data can be stored in the frame buffer, in accordance with one or more aspects of the invention. For example, image data can be stored as 8, 16, or 24-bit color bit maps. The outline of the storage of the image data (e.g., pixels) is shown in FIG. 5B.

In an 8-bit pixel representation, the standard 32-bit memory location of the display controller will have 4 pixels, and each pixel represents a color from a palette of 256 colors. In a 16-bit representation, the standard 32-bit memory location of the display controller contains 2 pixels. The typical representation of a pixel in this representation is 5 bits for Red, 6 bits for Green and 5 bits for Blue. This color palette can generate 65536 colors. In a 24-bit representation, the standard 32-bit memory location of the display controller will carry one 24-bit pixel and one 8-bit color representation for the next adjoining pixel. In a 24-bit configuration each color is accorded 8 bits. Thus, RGB forms a 24-bit representation for a pixel and the color palette can generate 16 million colors.

In the following, other embodiments of the invention are described in conjunction with one or more additional components that provide the system with additional functionality. Certain components are described with reference to specifications of certain manufacturers. These specifications are provided, however, by way of example and should not be construed to limit the scope of the invention to these specific products.

Graphic Transmitter

Figure 6:
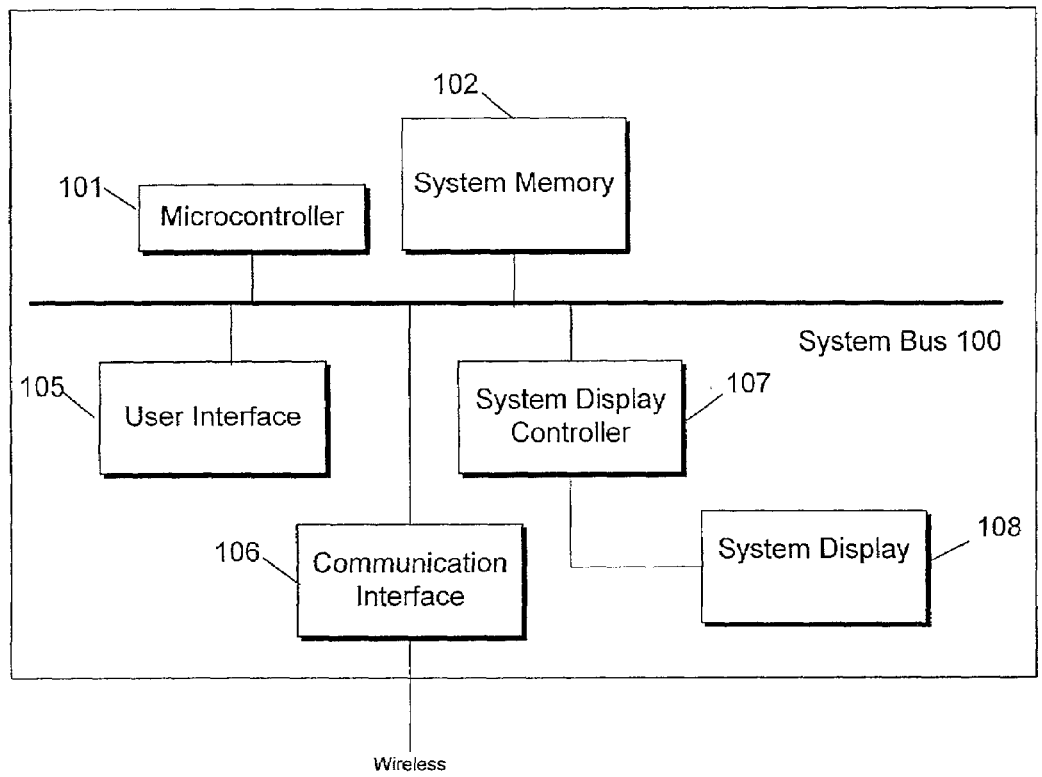
FIG. 6 is a block diagram illustrating the expansion module of FIG. 1 in accordance with an alternative embodiment of the invention, in conjunction with a handheld computing system and an external display device.
Figure 6:
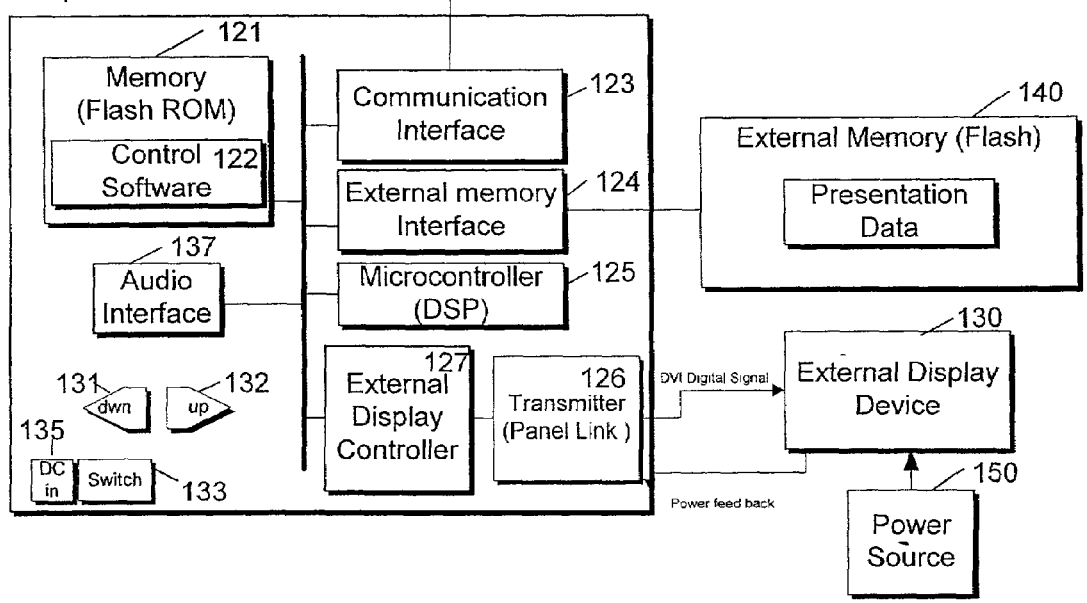

Referring to FIG. 6, in accordance with one aspect of the invention, expansion module 120 includes a graphic transmitter 126 for converting parallel digital output generated by external display controller 127 to serial digital output for display devices, according to industry standards. For example, in one embodiment of the system, graphic transmitter 126 is a PanelLink® transmitter manufactured by Silicon Image Inc., Sunnyvale, Calif.

As illustrated in FIG. 6, transmitter 126 resides in the expansion module 120 and receives the output stream generated by external display controller 127. In certain embodiments, transmitter 126 takes the digital stream generated by expansion module 120 and converts it to DVI-compliant digital output. DVI or Digital Visual Interface is a digital flat panel interface from the Digital Display Working Group (DDWG) that provides for a universal standard for sending digital information to display devices.

Embodiments of the system support Low Voltage Differential Signaling (LVDS) and Transition Minimized Differential Signaling (TMDS) transmission methods. These methods are well-known and are typically used for sending digital information to a flat panel display. The advantage of using these transmission methods is that fewer wires need to be used for transmission of image data as parallel digital output is converted into serial digital output. Furthermore, the above transmissions methods are more efficient in that they provide for lower power consumption, better protection against Electro Magnetic Interference (EMI), and higher transmission speeds for High Definition (HD) resolution signals.

External Display Plug and Display Feature

Certain embodiments of the invention, take advantage of a communication standard known as Display Data Channel or DDC to automatically configure the output format for external display device 130 upon attachment. A DDC is a standard communications channel that is used to pass Extended Display Identification Data (EDID) from external display device 130 to external display controller 127. EDID is stored in the external display device 130 and describes its characteristics (e.g., vendor name, serial number, frequency range). As such, DDC technology can be utilized to auto-configure the output generated by external display controller 127 so that the output is compatible with the requirements of external display device 130. Using DDC technology, external display controller 127 can query external display device 130 for EDID data, and configure the refresh rate and resolution of the output signals to match that of external display device 130 based on said EDID data.

Typically, DDC requires an additional wire in the connector cable that attaches external display controller 127 and external display device 130. The first level implementation (DDC1) provides a unidirectional channel that lets the external display device 130 inform external display controller 127 of its characteristics. A second bidirectional level (DDC2) allows the external display controller 127 to adjust the external display device 130. In some embodiments of the invention, the external display device 130's switch settings can be also implemented into a software control panel, for example, using the DDC communication standard.

External Microcontroller

Figure 7B:
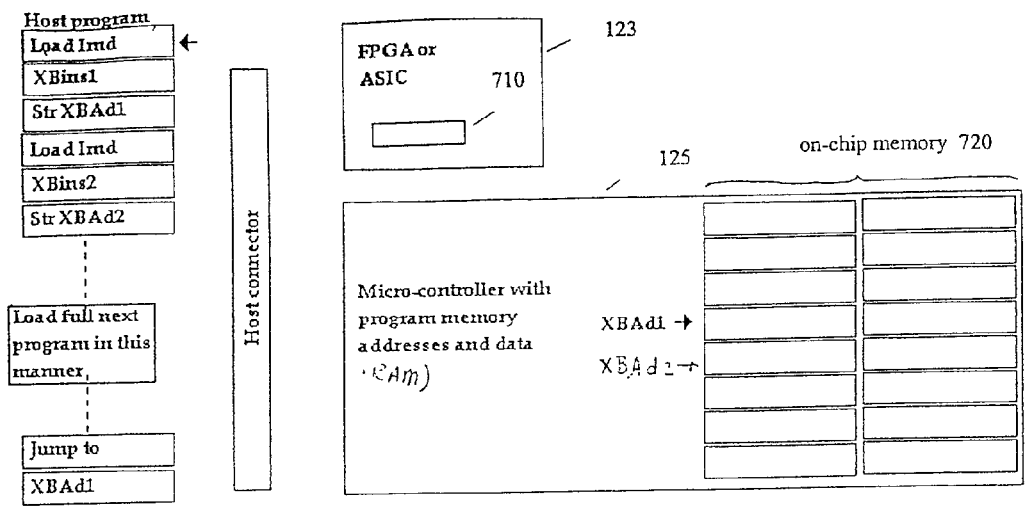
Figure 7B:
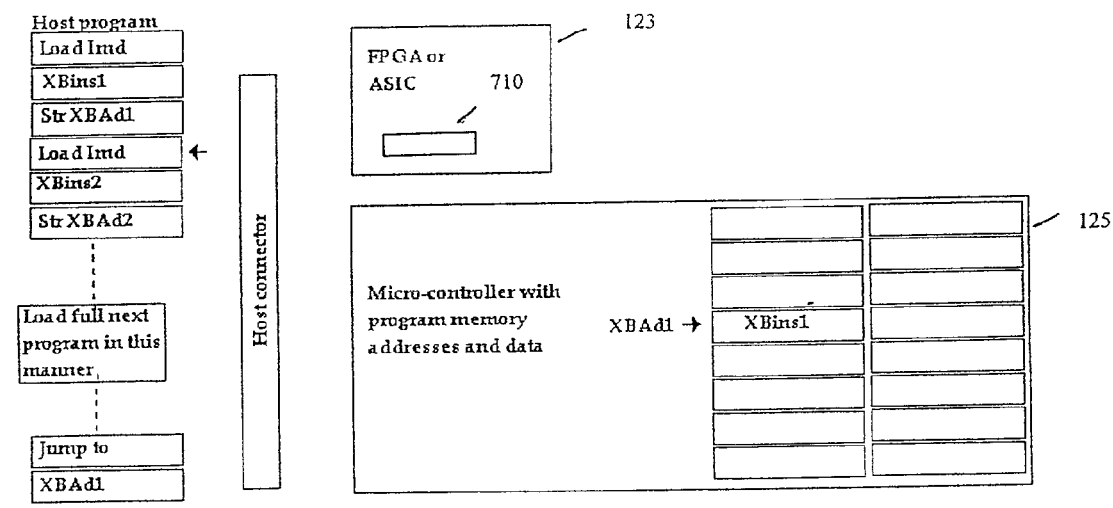

As illustrated in FIGS. 6 and 7A through 7B, in one embodiment of the system, expansion module 120 includes a microcontroller 125. In this embodiment, microcontroller 125 takes over the control of external display controller 127. Microcontroller 125 can be an on-board microcontroller or Digital Signal Processor (DSP) (e.g., a RISC microcontroller) in communication with portable computing system 110 through communication interface 123.

As illustrated in FIG. 7A, microcontroller 125 includes an on-chip memory 720 (e.g., 4k of Random Access Memory (RAM)) for storing program instruction and executing said instructions. Microcontroller 125 is implemented to execute program code without directly fetching program instructions from system memory 102 or module memory 121, thereby reducing complex routing and signaling requirements between handheld computing system 110 and expansion module 120, as described in more detail below.

In one embodiment, program code for processing and decoding image data is transferred via communication interface 123 to microcontroller 125 one word at a time. Microcontroller 125 saves each word of the program code in a specific location in on-chip memory 720. Once all the program code has been stored in on-chip memory 720 then the program code is executed locally in on-chip memory 720. Once microcontroller 125 starts executing the program code, then image data is transferred from handheld computing system 110 to microcontroller 125 for processing. The program code running in on-chip memory decodes and decompresses the image data.

In one embodiment of the system, the full width of data buses of handheld computing system 110 and microcontroller 125 and a minimum number of address lines (e.g., four address lines) are assigned to communication interface 123, in a well-known manner. FIG. 5C illustrates a register map for register addresses implemented to provide four address lines in communication interface 123, in accordance with one or more aspects of the system. This implementation obviates the need for providing microcontroller 125 with access to address buses associated with system memory 102 and/or memory 121. It further resolves the complications associated with signal routing and control arbitration issues between handheld computing system 110 and expansion modules 120, and other complexities that may arise from implementing the communication interface between the two.

As described earlier, in embodiments of the invention communication interface 123 is an ASIC or FPGA implemented to convert 16-bit data to 32-bit data to meet the addressing requirements of expansion module 120. In addition to data and address lines, control lines are implemented between the following, in a well-known manner: handheld computing device 110 and communication interface 123; communication interface 123 and microcontroller 125; and microcontroller 125 and external display controller 127. Microcontroller 125 is connected to external display controller 127 in a well-known manner so that it can transmit decoded image information to external display controller 127's frame buffer. In this embodiment, handheld computing system 110's microcontroller 101 does not access external display controller 127.

FIGS. 7A through 7D are block diagrams according to one or more embodiments of the invention illustrating the manner in which program instructions are loaded onto on-chip memory 720 of microcontroller 125. Communication interface 123 includes a data transaction register 710. Data transferred from handheld computing system 110 is stored in data transaction register 710 until it is processed by microcontroller 125. In accordance with one aspect of the invention, because microcontroller 125 cannot directly access program instruction and data stored in system memory 102 or expansion module memory 121, said information is fetched by microcontroller 101 and transferred to microcontroller 125 via communication interface 123. Program instructions are loaded into data transaction register 710. Microcontroller 125 fetches the content of data transaction register 710 and stores it as instructions in on-chip memory 720 for future execution.

Figure 8:
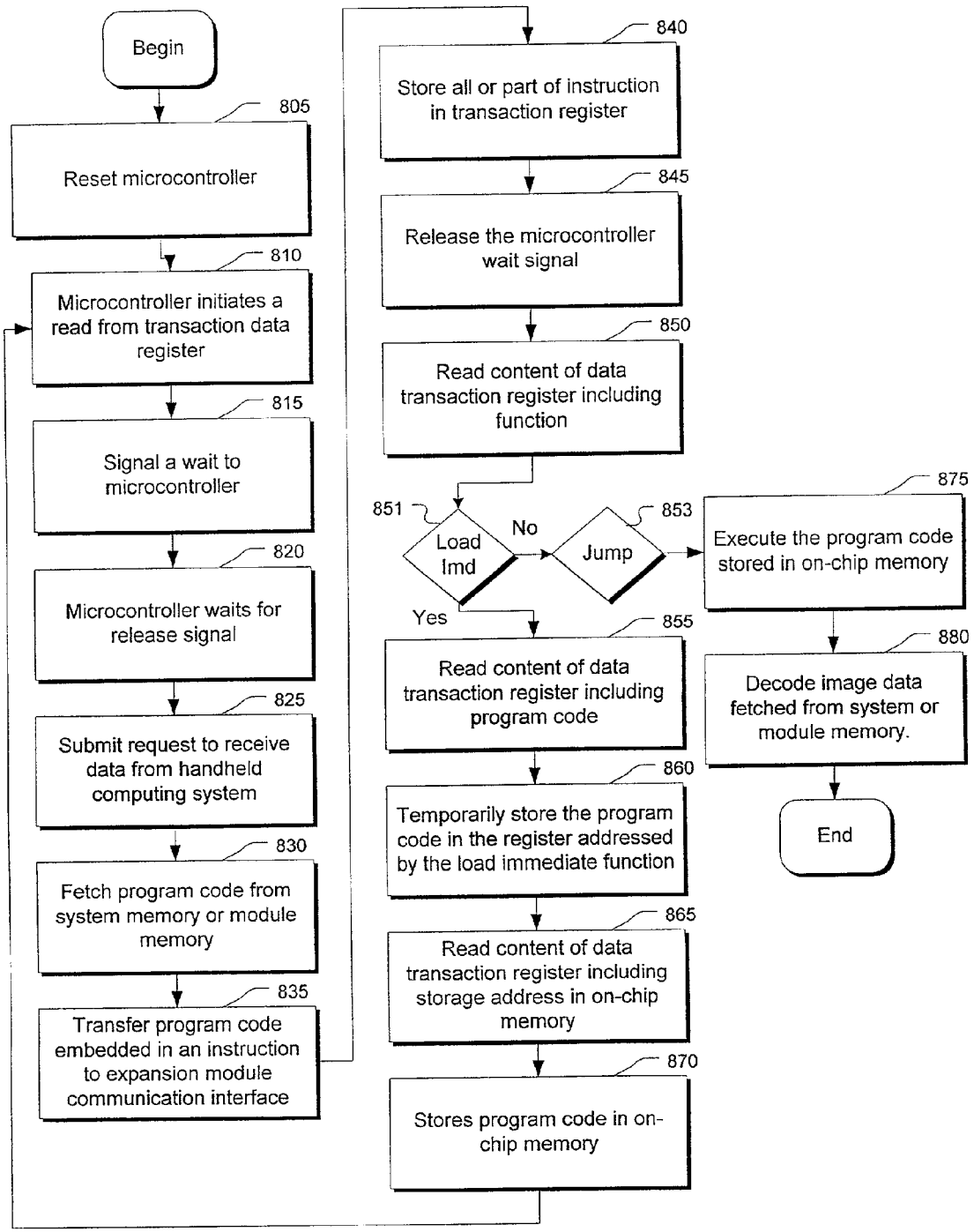
FIG. 8 is a flow diagram illustrating a method for transfer of information from the handheld computing system to the expansion module of FIG. 6, according to one or more embodiments of the system.

FIG. 8 is a flow diagram illustrating a method for transfer of program code from handheld computing system 110 to expansion module 120's microprocessor 125, according to one or more embodiments of the invention. At step 805, system software loaded on handheld computing system 110 resets microcontroller 125. FIG. 7A illustrates the contents of the data transaction register 710 and on-chip memory 720 after reset. After reset, microcontroller 125 initiates a read from data transaction register 710, at step 810. At step 815, communication interface 123 is implemented to signal a wait to microcontroller 125. At step 820, microcontroller 125 waits for a release signal from communication interface 123. At step 825, communication interface 123 requests to receive data from handheld computing system 110.

At step 830, system software causes microcontroller 101 to fetch program code (e.g., code required for decoding image data, or any other program code) from memory 102 or 121. As described earlier to reduce routing and signaling complexities, a limited number of address lines are implemented in the system such that microcontroller 125 does not access memory 102 and 121 to address the program code or data stored thereon, directly. Therefore, at step 835, microcontroller 101 places the program code embedded in an instruction on the data bus and transfers the instruction to communication interface 123. At step 840, depending on implementation, all or parts of the instruction are stored in data transaction register 710.

In embodiments of the system, each instruction is 48 bits (i.e., contains three words) and data transaction register 710 is a 16-bit register. Because of its limited size, data transaction register 710 stores one word (each word is 16 bits) at a time. As a result, to process each instruction, data transaction register 710 has to load three words, in three separate intervals. Each word in the instruction contains one of program code, data, and/or a function. The function instructs microcontroller 125 what to do with the data or program code stored in data transaction register 710. For example, the first instruction can be illustrated in the following manner (see FIG. 7A):

| Load Imd | Xbins1 | StrXBAd1 |

"Load Imd" is a load immediate function that includes an op-code indicating the type of instruction and the register address in which the next word loaded into data transaction register 710 is to be stored. In embodiments of the invention, microcontroller 125 in addition to on-chip memory 720, also includes another set of registers (not shown) that are used for temporary storage of information before the information is stored onto on-chip memory 720. Xbins1 is a part of program code, for example, that is to be stored in on-chip memory 720 for execution. StrXBAd1 is the memory address of the location in on-chip memory 1720 in which Xbins1 will be stored, for example. In accordance with one aspect of the invention, content of data transaction register 710, at step 840, can be illustrated as the following:

| Load Imd |

At step 845, communication interface 123 releases the microcontroller 125's wait signal. At step 850, microcontroller 125 reads the content of data transaction register 710. At step 851, microcontroller 125 reads the op-code portion of the 16-bit word stored in data transaction register 710 to determine the type of function, and the remaining portion to determine the register address. If the data in the transaction register 710 is a load function then, at step 855, microcontroller 125 initiates a second read from data transaction register 710. In the second read cycle, the second word (e.g., "Xbins1") is loaded into data transaction register 710. In accordance to one aspect of the invention, content of data transaction register 710, after step 855, can be illustrated as the following:

| Xbins1 |

The second word (e.g., XBins1) includes program code. At step 860, microcontroller 125, temporarily stores the second word in the register addressed by the load immediate function. At step 865, the third word (e.g., StrXBAd1) is loaded into data transaction register 710. In accordance to one aspect of the invention, content of data transaction register 710, after step 865, can be illustrated as the following:

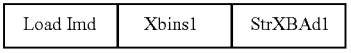

The third word (e.g., StrXBAd1) includes an address in on-chip memory 720, where program instruction contained in the second word is to be stored. At step 870, microcontroller 125 stores program code XBins1 in memory location XBAd1. FIG. 7B illustrates the contents of on-chip memory 720 after step 870 is completed.

It should be noted that the above-described architecture is provided by way of example. Other embodiments of the system may be implemented to support 32 bit, or 48 bit registers that can process an entire instruction line at one time. Other implementation are also possible.

Figure 7C:
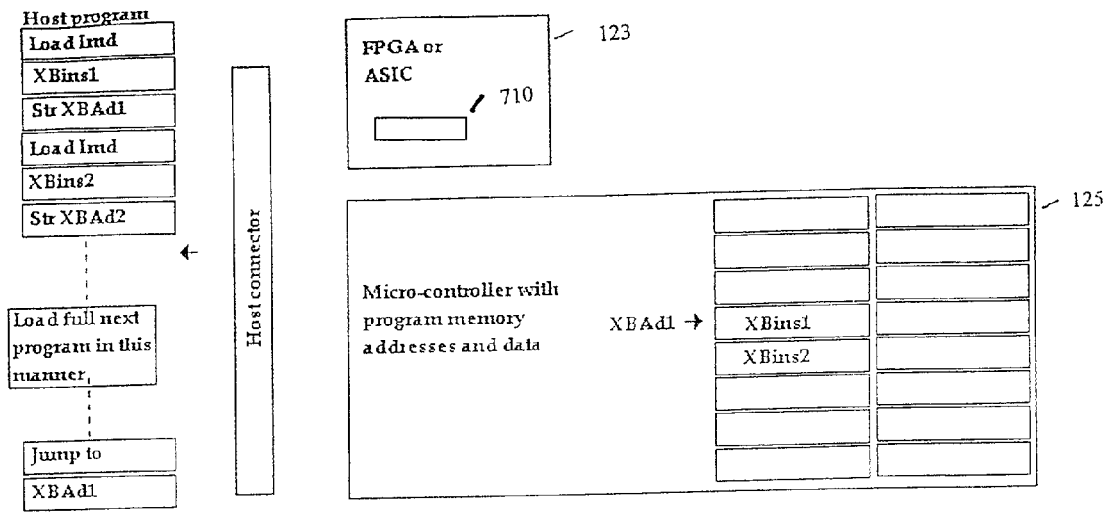

Referring to FIG. 8, in accordance with one aspect of the system, after the first instruction is fetched, the system reverts to step 810 and initiates another read to fetch another set of instructions. FIG. 7C illustrates the contents of the data transaction register 710 and on-chip memory 720 after the second set of instructions is fetched. The system continues to transfer program code to on-chip memory 720 until the system reads and detects a jump function at steps 853.

Figure 7D:
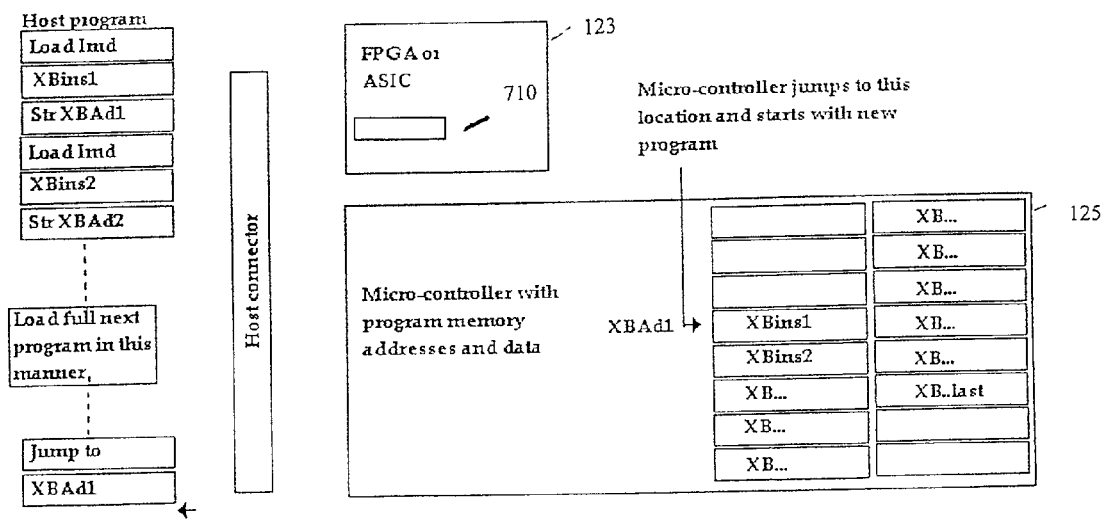

A jump function includes the address of the memory location in which the first set of program code is stored in on-chip memory 720 (e.g., XBAd1). Upon reading the jump instruction, at step 875, microcontroller 125 executes the program code stored in on-chip memory 720, starting at the address referenced by the jump function. FIG. 7D illustrates the contents of on-chip memory 720 after the last set of instructions is fetched. In embodiments of the invention, the program code being executed in on-chip memory, for example, decodes image data fetched from system or module memory, at step 880.

Figure 9:
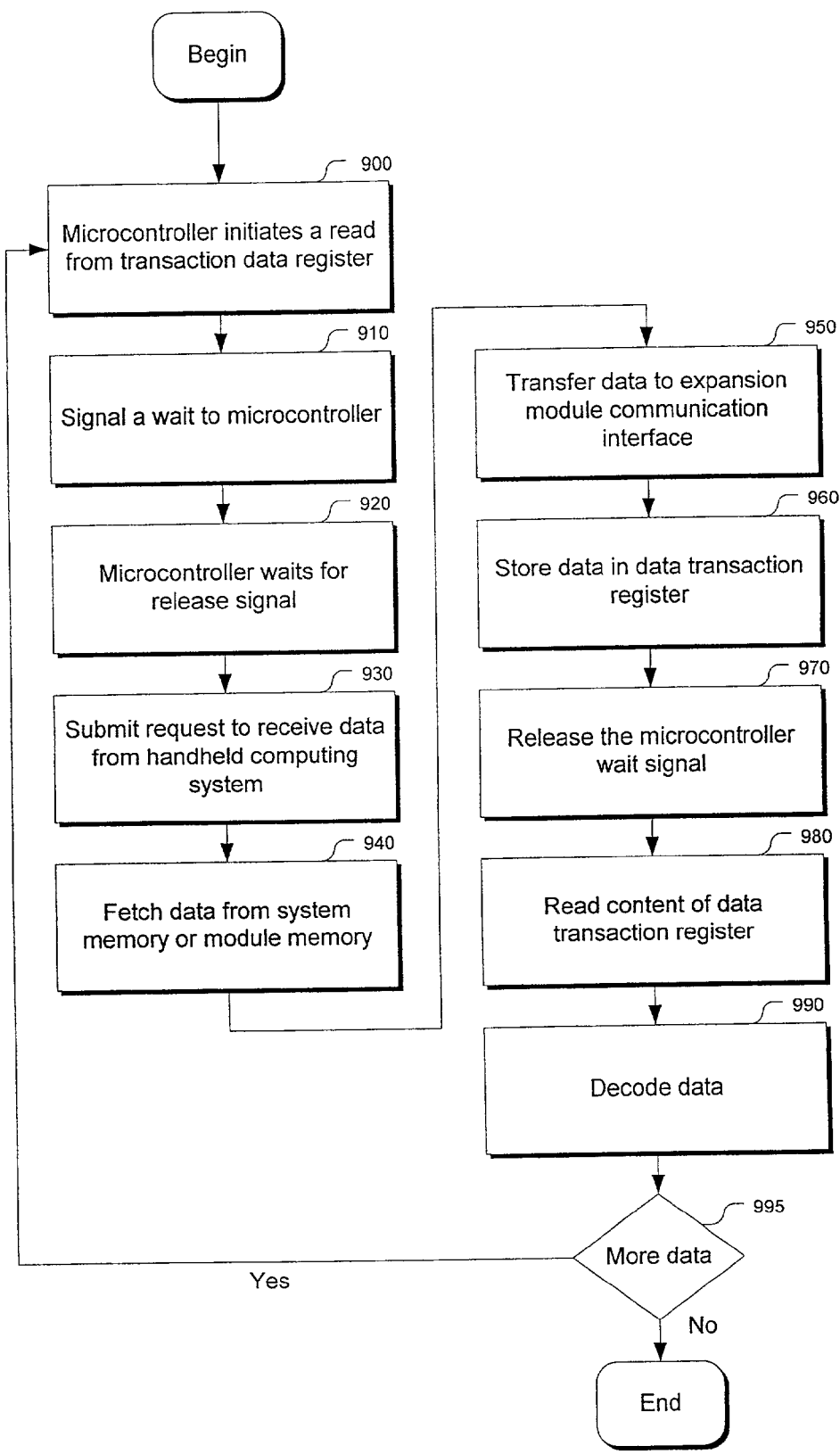
FIG. 9 illustrates a method for transferring image data to a microcontroller in the expansion module of FIG. 6 for processing, in accordance with one or more embodiments of the system.

Image data is fetched and transferred to microcontroller 125 for processing in a manner illustrated in FIG. 9. At step 900, microcontroller 125 initiates a read from data transaction register 710. At step 910, communication interface 123 signals a wait to microcontroller 125. At step 920, microcontroller 125 waits for the release signal. At step 930, communication interface 123 submits request to receive data from handheld computing system 110. At step 940, handheld computing system 110's microcontroller 101 fetches data from system memory or module memory.

At step 950, the data is transferred to expansion module 120's communication interface 123. At step 960, the data is stored in data transaction register 710 in communication interface 123. At step 970, communication interface releases the wait signal for microcontroller 125. At step 980, microcontroller 125 reads the content of data transaction register 710. At step 990, the program code executing in on-chip memory 720 decodes data read from data transaction register 710. At step 995, if more image data is to be decoded then the system reverts to step 900.

In accordance with one aspect of the system, microcontroller 101 transfers image data and program code to microcontroller 125's internal memory. As such, embodiments of the system that are implemented to include microcontroller 125 can operate independent from handheld computing unit 110.

Wireless Communication

Referring to FIG. 6, embodiments of the system are implemented such that handheld computing system 110, expansion module 120, and external display device 130 can communicate in a wireless environment. Many handheld computing systems such as Palm and Visor are equipped with infrared ports for data transmission. Accordingly, embodiments of the invention are implemented to include infrared receivers and transmitters to communicate with the currently available devices. IrDA is a standard developed by Infrared Data Association, Walnut Creek, Calif, that provides for infrared communication between various computing systems. With IrDA ports, a handheld computing system can exchange data with a desktop computer or use a printer without a cable connection. IrDA requires line-of-sight transmission.

In alternate embodiments of the invention, wireless connections can be established by incorporating communication interfaces that promote the exchange of information using radio (RF) technology, such as Bluetooth. Bluetooth is a wireless personal area network (PAN) technology from the Bluetooth Special Interest Group (founded by Ericsson, IBM, Intel, Nokia and Toshiba). Bluetooth is an open standard for short-range transmission of digital voice and data between mobile devices (laptops, PDAs, phones) and desktop devices. Bluetooth provides up to 720 Kbps data transfer within a range of 10 meters and up to 100 meters with a power boost. Unlike IrDA which requires a line-of-sight transmission, Bluetooth uses oninidirectional radio waves that can transmit through walls and other non-metal barriers.

Other wireless standards and technologies, such as IEEE 802.11, may be used in other embodiments of the invention, to provide for a means of communication between handheld computing system 110, expansion module 120, and external display 130.

Additional Features

Referring to FIG. 6, embodiments of the system are implemented to include an external memory interface, so that an external memory module 140 can be connected to the system. External memory 140 can be a flash card or memory stick device. To maintain compatibility with VGA analog displays and TV set, an analog output and TV output may be also included to one embodiment of the invention, in a well-known manner.

Certain embodiments of the invention are implemented to include audio ports for attachment to microphones or speakers. In yet other embodiments of the system, an on/off switch 133 may be implemented to allow a user to turn expansion module 120 on or off. Some embodiments of the invention may include a DC or AC inlet for attachment to a battery pack, power socket, or a power feedback line, as illustrated in FIG. 6, for attachment to external display device 130, to conserve battery life of handheld computing system 110.

One or more embodiments of the invention are also implemented to work with a remote control device. According, a user may use a remote control device to control the display of images on a display device 130 without directly interacting with expansion module 120, or handheld computing device 110.

It should be understood that system configurations are disclosed here by way of example. Other system architectures, platforms, and implementations that can support the transmission and display of information on an external display may be utilized. Thus, a system and method for displaying graphical presentations on a display device using a handheld computing device is described, in conjunction with one or more specific embodiments. These and various other adaptations and combinations of features of the embodiments disclosed are within the scope of the invention. The invention is defined by the following claims and their full scope of equivalents.

The invention claimed is:

1. A method for loading a presentation on a handheld computing device, comprising:
   writing image data to a driver;
   invoking the driver to compress the image data;
   invoking the driver to store the compressed image data in a presentation database;
   executing control software to transfer the presentation database to the handheld computing device; and
   attaching an expansion module to the handheld computing device for displaying the presentation data on an external display, the handheld computing device having a first memory, and the expansion module having a second memory.

2. The method of claim 1, wherein the presentation database is transferred to the first memory.

3. The method of claim 1, wherein the presentation database is transferred to the second memory, wherein the second memory is an extension of said first memory.

4. The method of claim 1, wherein the control software is in the first memory.

5. The method of claim 1, wherein the control software is in the second memory.

6. The method of claim 1, wherein the control software is executed in the handheld computing device.

7. The method of claim 1, wherein the control software is executed in the expansion module.

8. The method of claim 1, further comprising:
   decoding the image data included in the presentation database and forwarding it to the expansion module.

9. The method of claim 8, further comprising:
   converting the decoded image data to signals for delivery to an external display device.

10. The method of claim 1, wherein the expansion module providing communication between the handheld computing device and the external display.

11. The method of claim 10, wherein a microcontroller for executing the control software is included in the handheld computing device.

12. The method of claim 10, wherein the microcontroller for executing the control software is included in the expansion module.

13. The method of claim 1, wherein a control interface displayed on the handheld computing device displays a reference to one or more presentation databases such that in response to a user selecting a presentation database, one or more slides are displayed.

14. The method of claim 13, further comprising:
   selecting one or more of the displayed slides to be included in a slide show for display on an external display.

15. The method of claim 14, further comprising:
   rearranging a display order of slides in the slide show by moving a box representing a slide in a first display position to a second display position.

16. The method of claim 15, further comprising:
   setting the length of the slide show by interacting with a menu provided by the control interface.

17. The method of claim 16, further comprising:
starting a slide show by interacting with the control interface.

18. The method of claim 16, further comprising:
promoting the display of a slide in the slide show by interacting with the control interface.

19. A method for loading a presentation on a handheld computing device, comprising:
writing image data to a driver, the driver including data compression and presentation organizer software;
invoking the compression software to compress image data;
invoking the organizer software to store the compressed image data in a presentation database; and
executing control software to transfer the presentation database to the handheld computing device;
wherein the handheld computing device is attached to an expansion module for displaying the presentation data on an external display, the handheld computing system having a first memory, and the expansion module having a second memory.

20. The method of claim 19, further comprising:
transferring program code for processing and decoding the image data from the handheld computing device to the expansion module.

21. The method of claim 19, further comprising:
transferring program code for processing and decoding the image data from the handheld computing device to the expansion module; and
the expansion module locally executing the transferred program code to decode and decompress the image data.

22. The method of claim 19, further comprising:
the expansion module receiving signals from a user through a remote control device to control the display of images on the external display.

23. The method of claim 19, further comprising:
the handheld computing device receiving signals from a user through a remote control device to control the display of images on the external display.

* * * * *